(12) United States Patent
Small

(10) Patent No.: US 12,180,981 B1
(45) Date of Patent: Dec. 31, 2024

(54) DUST-COLLECTING DEVICE FOR FAN BLADES

(71) Applicant: Robert Lee Small, Pinopolis, SC (US)

(72) Inventor: Robert Lee Small, Pinopolis, SC (US)

( * ) Notice: Subject to any disclaimer, the term of this patent is extended or adjusted under 35 U.S.C. 154(b) by 0 days.

(21) Appl. No.: 18/588,230

(22) Filed: Feb. 27, 2024

(51) Int. Cl.
*F04D 29/70* (2006.01)
*B01D 46/00* (2022.01)
*B01D 46/40* (2006.01)

(52) U.S. Cl.
CPC ....... *F04D 29/703* (2013.01); *B01D 46/0056* (2013.01); *B01D 46/403* (2013.01); *B01D 2265/02* (2013.01)

(58) Field of Classification Search
CPC .... F04D 25/088; F04D 29/703; F04D 29/388; F04D 29/002; F04D 29/023; F04D 29/181; F04D 29/325; F04D 29/384; B01D 46/10; B01D 46/0056; B01D 2265/04; B01D 46/0028; B01D 46/0036; B01D 46/02; B01D 46/403; B01D 2265/02; A47L 25/00; A47L 13/38; A61L 9/122; F24F 2221/14; F24F 13/28
See application file for complete search history.

(56) References Cited

U.S. PATENT DOCUMENTS

| | | | | |
|---|---|---|---|---|
| 4,840,650 A | * | 6/1989 | Matherne | F24F 8/10 55/504 |
| 5,795,131 A | * | 8/1998 | Crowhurst | F04D 29/703 55/DIG. 39 |
| 6,790,004 B2 | | 9/2004 | Steinheiser | |
| 6,857,852 B1 | * | 2/2005 | Carfagna | F04D 25/088 416/62 |
| D510,426 S | | 10/2005 | Garcia, Jr. | |
| 7,052,524 B1 | * | 5/2006 | Venezzio, Jr. | B01D 46/0005 422/123 |
| 7,115,158 B1 | | 10/2006 | Landrum | |
| 9,599,116 B1 | * | 3/2017 | Winger | F04D 29/325 |
| 2012/0224967 A1 | | 9/2012 | Radabaugh | |
| 2013/0340190 A1 | | 12/2013 | Allen | |
| 2017/0030379 A1 | | 2/2017 | Garcia | |
| 2020/0318643 A1 | | 10/2020 | Fulcher | |
| 2021/0170319 A1 | | 6/2021 | Robinette | |

FOREIGN PATENT DOCUMENTS

CA 2488458 12/2002

* cited by examiner

*Primary Examiner* — Eric J Zamora Alvarez

(57) ABSTRACT

The dust collecting device for fan blades is a cleaning device. The dust collecting device for fan blades removes dust that is suspended in the air. The dust collecting device for fan blades incorporates a fan blade and a collection structure. The collection structure mounts on the fan blade. The collection structure moves with the fan blade as the fan blade moves through the air. As the fan blade moves through the air, the collection structure generates a turbulence in the air that generates the motive forces required to dislodge the dust that is suspended in the air. The collection structure further captures and immobilizes the dislodged dust that falls out of the air onto the fan blade.

11 Claims, 5 Drawing Sheets

DUST-COLLECTING DEVICE FOR FAN BLADES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of blades characterized by construction. (F04D29/388)

SUMMARY OF INVENTION

The dust collecting device for fan blade is a cleaning device. The dust collecting device for fan blade removes dust that is suspended in the air. The dust collecting device for fan blade comprises a fan blade and a collection structure. The collection structure mounts on the fan blade. The collection structure moves with the fan blade as the fan blade moves through the air. As the fan blade moves through the air, the collection structure generates a turbulence in the air that generates the motive forces required to dislodge the dust that is suspended in the air. The collection structure further captures and immobilizes the dislodged dust that falls out of the air onto the fan blade.

These together with additional objects, features and advantages of the dust collecting device for fan blade will be readily apparent to those of ordinary skill in the art upon reading the following detailed description of the presently preferred, but nonetheless illustrative, embodiments when taken in conjunction with the accompanying drawings.

In this respect, before explaining the current embodiments of the dust collecting device for fan blade in detail, it is to be understood that the dust collecting device for fan blade is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the dust collecting device for fan blade.

It is therefore important that the claims be regarded as including such equivalent construction insofar as they do not depart from the spirit and scope of the dust collecting device for fan blade. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
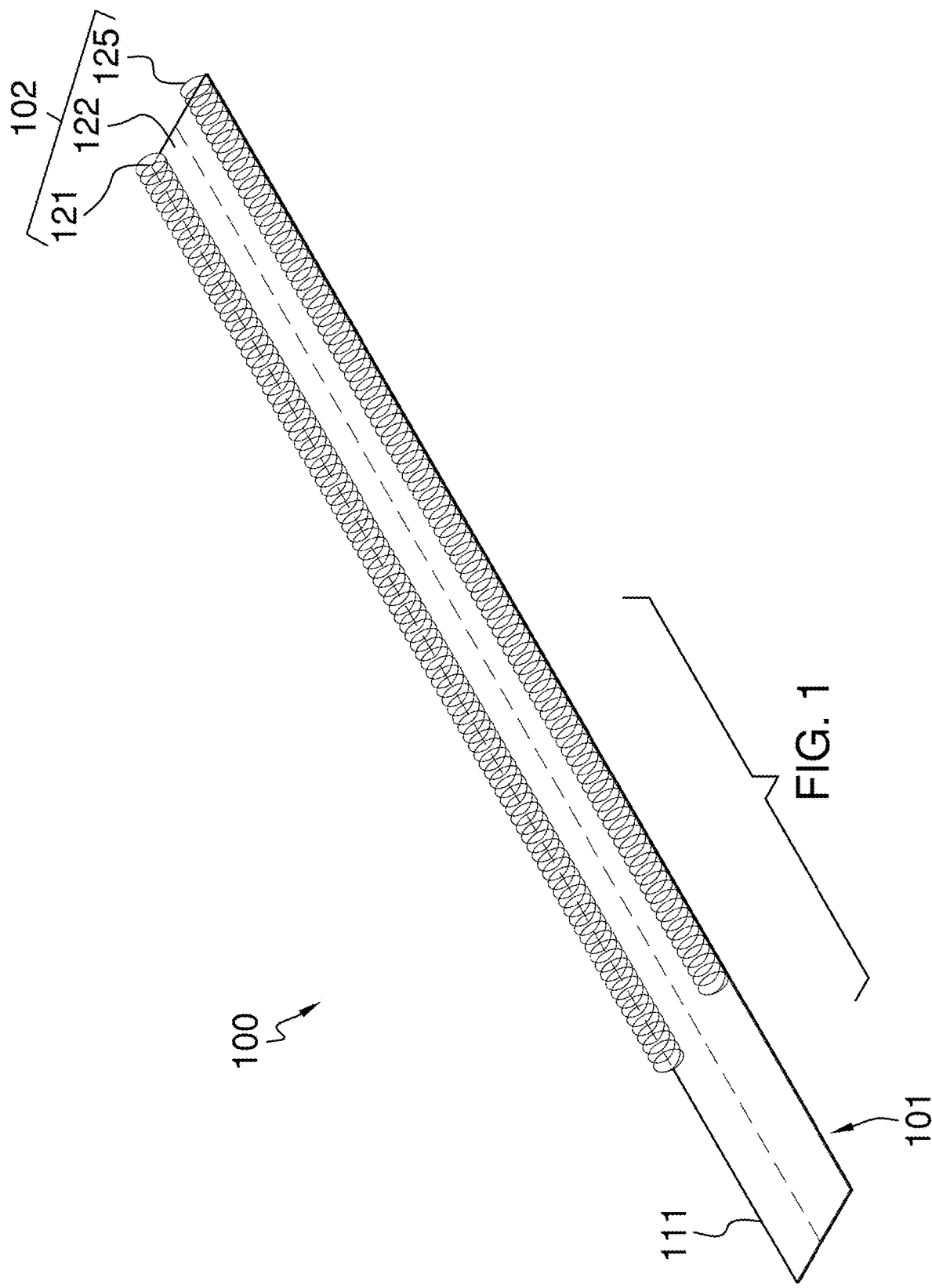
FIG. 1 is a perspective view of an embodiment of the disclosure.
Figure 2:
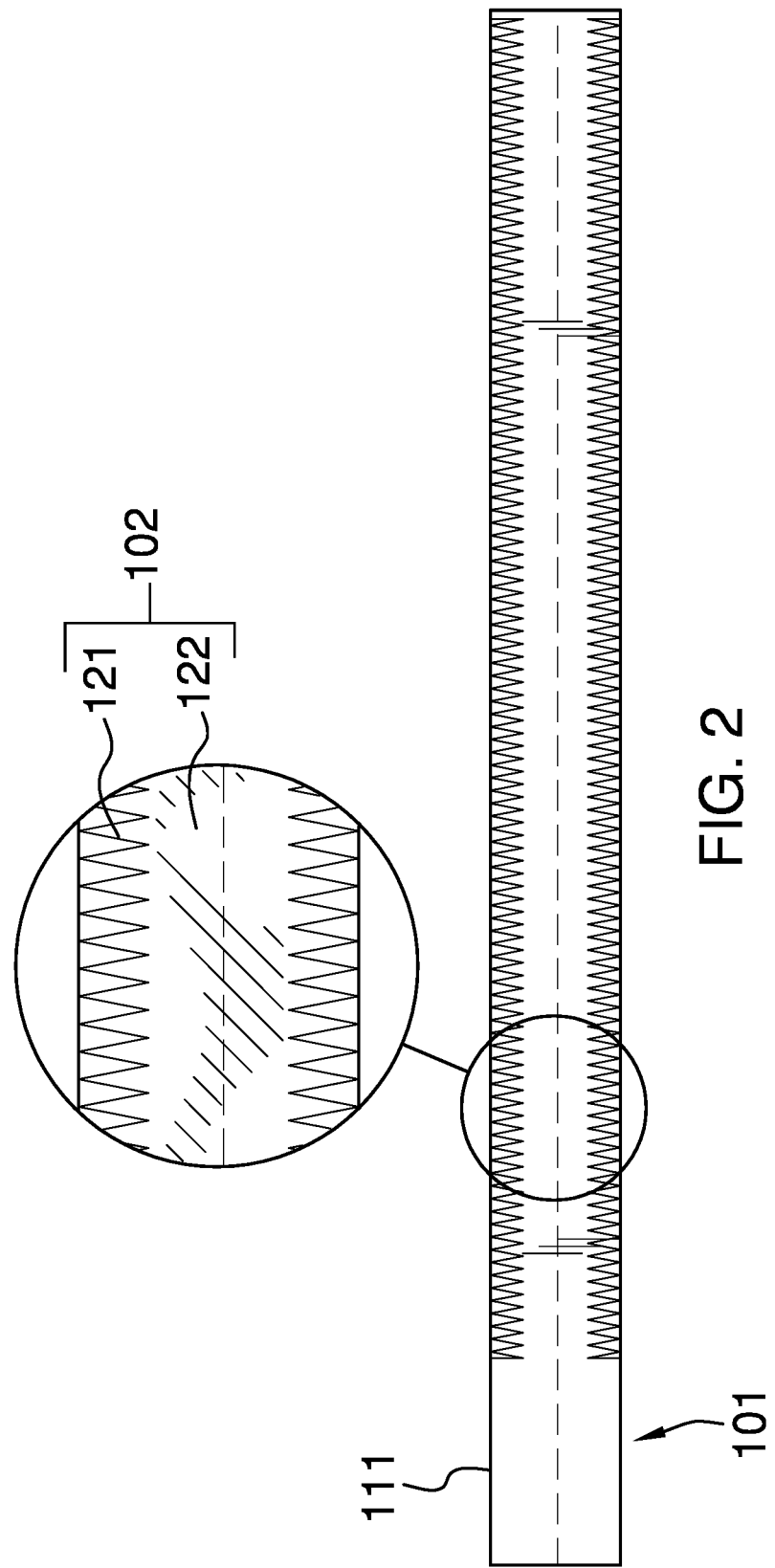
FIG. 2 is a superior view of an embodiment of the disclosure.
Figure 3:
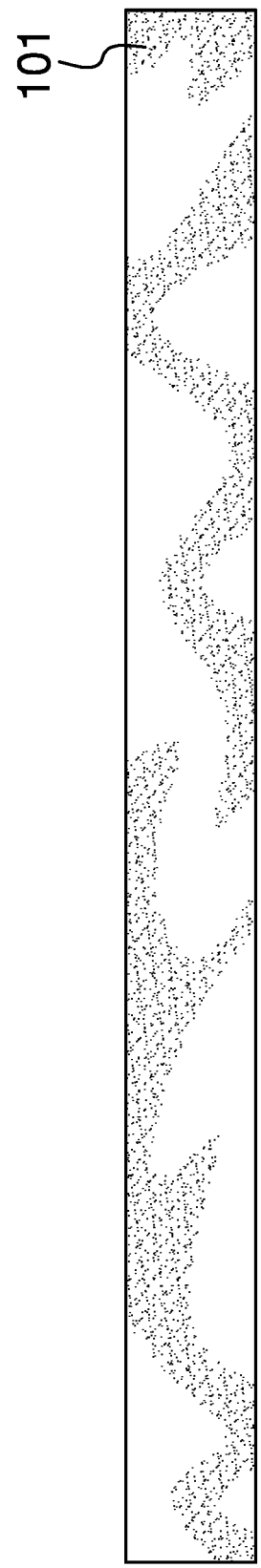
FIG. 3 is an inferior view of an embodiment of the disclosure.
Figure 4:
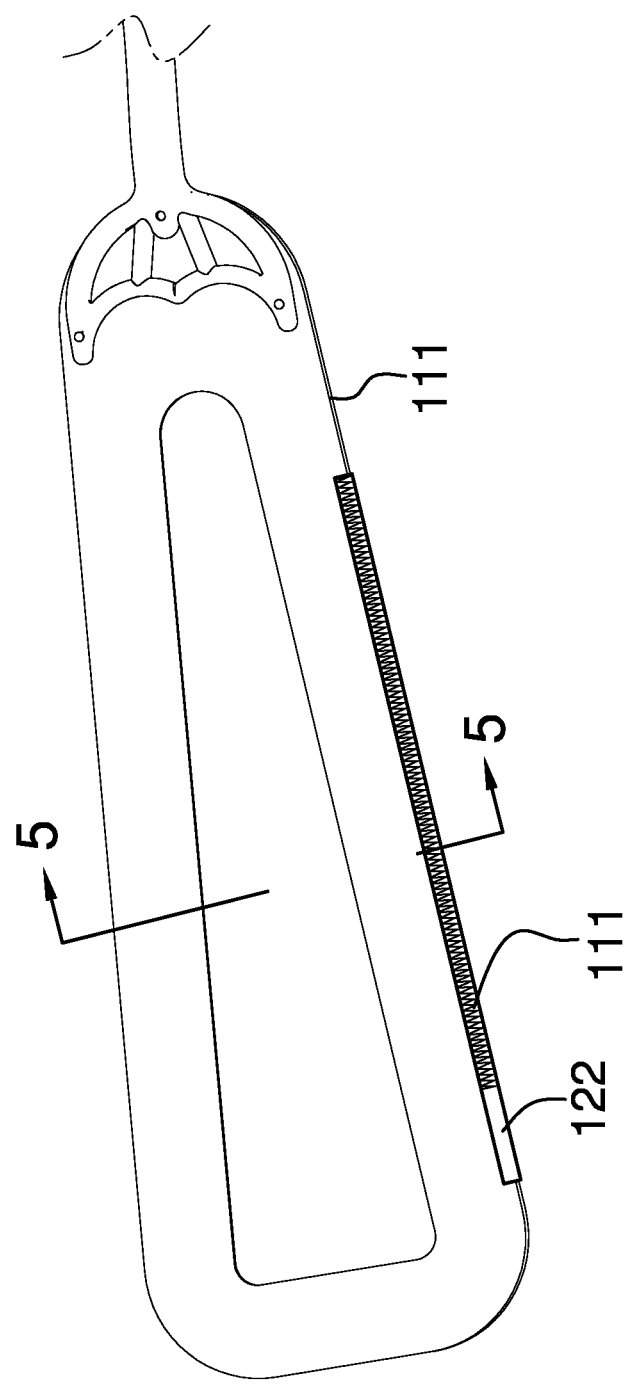
FIG. 4 is an in-use view of an embodiment of the disclosure.
Figure 5:
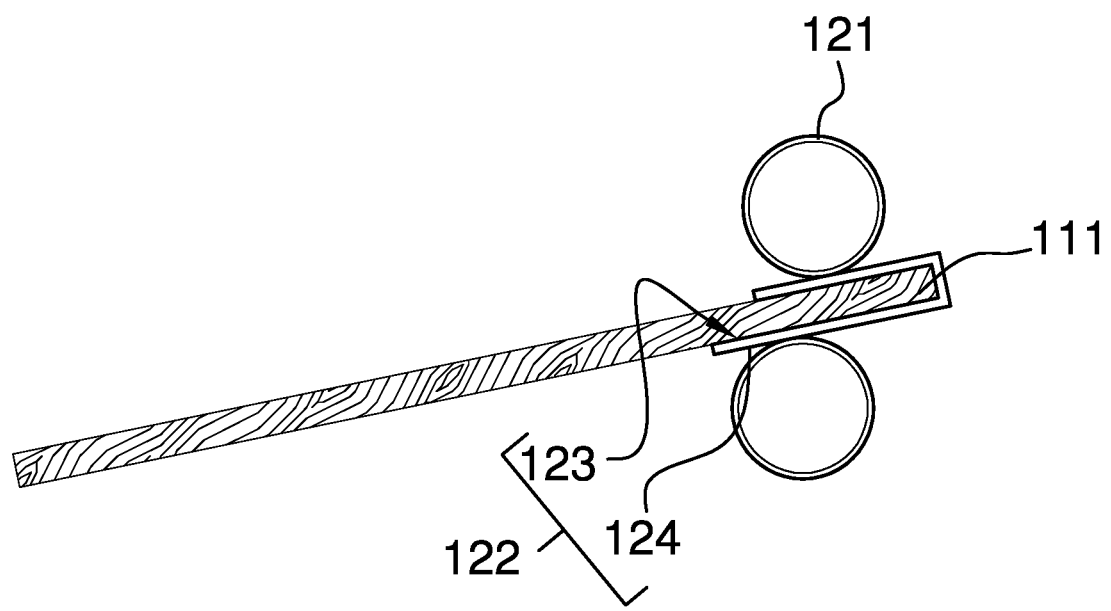
FIG. 5 is a cross-sectional view of an embodiment of the disclosure across 5-5 as shown in FIG. 4.

Detailed reference will now be made to one or more potential embodiments of the disclosure, which are illustrated in FIGS. 1 through 5.

The dust collecting device for fan blade 100 (hereinafter invention) is a cleaning device. The invention 100 removes dust that is suspended in the air. The invention 100 comprises a fan blade 101 and a collection structure 102. The collection structure 102 mounts on the fan blade 101. The collection structure 102 moves with the fan blade 101 as the fan blade 101 moves through the air. As the fan blade 101 moves through the air, the collection structure 102 generates a turbulence in the air that generates the motive forces required to dislodge the dust that is suspended in the air. The collection structure 102 further captures and immobilizes the dislodged dust that falls out of the air onto the fan blade 101.

The fan blade 101 is an airfoil. The fan blade 101 forms the working element of a rotating tool referred to as a fan. The fan blade 101 generates an air flow in a predetermined direction as the fan rotates the fan blade 101 through the air. The fan blade 101 further comprises a leading edge 111. The leading edge 111 forms the edge of the airfoil structure of the fan blade 101 that leads the fan blade 101 through the air. The leading edge 111 redirects the air around the fan blade 101 into the predetermined direction.

The collection structure 102 is a mechanical structure. The collection structure 102 attaches to the fan blade 101. The collection structure 102 generates a turbulence in the air that flows through the collection structure 102. The turbulence generated by the collection structure 102 provides the motive forces that dislodge the dust that is suspended in the air. The collection structure 102 collects and stores the dust that was dislodged from the air. The collection structure 102 immobilizes the captured dust that was dislodged from the air for subsequent disposal. The collection structure 102 comprises a first helical coil 121 and an adhesive tape structure 122. Optionally, the collection structure 102 may further include a second helical coil 125.

The first helical coil 121 is a mechanical structure. The first helical coil 121 forms a helix. The first helical coil 121 is a rigid structure. The first helical coil 121 is formed as a coil from a non-Euclidean prism structure. The first helical coil 121 mounts on the superior surface of the fan blade 101. The second helical coil 125 mounts on the inferior surface of the fan blade 101.

The first helical coil 121 mounts on the fan blade 101 such that the center axis of the coil structure of the first helical coil 121 aligns with the leading edge 111 of the fan blade 101. Moreover, the second helical coil 125 is opposite the first helical coil 121.

The coils of the first helical coil 121 pass through the air at an angle that is roughly perpendicular to the leading edge 111 of the fan blade 101. As the first helical coil 121 passes through the air, it generates the turbulence that dislodges the dust that is suspended in the air. The first 17 helical coil 121 dislodges the dust that is suspended in the air such that a portion of the dust that was dislodged from the air falls upon the superior surface of the fan blade 101.

The adhesive tape structure 122 is a sheeting structure. The adhesive tape structure 122 forms a tape. The adhesive tape structure 122 is an adhesive structure. The adhesive tape structure 122 attaches to the fan blade 101. The adhesive tape structure 122 form an adhesive surface that captures and immobilizes the dust that was dislodged from the air. The adhesive tape structure 122 further comprises an interior face 123 and an exterior face 124.

The interior face 123 forms the face of the sheeting structure of the adhesive tape structure 122 that is against the superior surface of the fan blade 101. The interior face 123 is coated with a removable adhesive coating. The removable adhesive coating removably attaches the adhesive tape structure to the fan blade 101. The removable adhesive coating allows for the replacement of the adhesive tape structure 122.

The exterior face 124 forms the face of the sheeting structure of the adhesive tape structure 122 that is distal from the superior surface of the fan blade 101. The exterior face is coated with an adhesive coating. The adhesive coating captures the dust that was dislodged from the air as the first helical coil 121 flows through the air. The adhesive coating on the exterior face 124 immobilizes the captured dust that was dislodged from the air until the adhesive tape structure 122 is disposed of.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives. See removable adhesive, pressure sensitive adhesive, heat activated adhesive.

Adhesive Tape: As used in this disclosure, an adhesive tape refers to a tape with an adhesive coating on at least one face of the tape.

Airfoil: As used in this disclosure, an airfoil is a curved structure. The airfoil is designed to move through a fluid. The design of the curvature of the airflow manipulates the forces created by the flow of the fluid around the airflow such that mechanical work is performed by the airfoil.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Atmosphere: As used in this disclosure, the atmosphere refers to a blanket of gases (primarily nitrogen and oxygen) that surround the earth. Typical atmospheric conditions are approximated and characterized as the normal temperature and pressure. Atmospheric gases are commonly called air.

Blade: As used in this disclosure, a blade is a term that is used to describe: 1) a wide and flat portion of a structure; or, 2) the cutting edge of a tool.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clean: As used in this disclosure, the term clean refers to an object without dirt, unwanted markings, or undesirable pathogens. When referring to a surface, the term clean can also refer to removing unwanted objects from the surface. The term cleaning refers to the action of making an object clean.

Coating: As used in this disclosure, a coating refers to a substance that is applied to the exterior surface of an object such that the coating forms a new exterior surface of the object. A coating is commonly said to be formed as a layer. Paint is an example of a common coating material.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Dust: As used in this disclosure, dust refers to particulates with a diameter of between 1 and 1000 micrometers.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Phase: As used in this disclosure, phase refers to the state of the form of matter. The common states of matter are solid, liquid, gas, and plasma.

Primary Shape: As used in this disclosure, the primary shape refers to a description of the rough overall geometric shape of an object that is assembled from multiple components or surfaces.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Removable Adhesive: As used in this disclosure, a removable adhesive is a commercially available adhesive that is designed with a lower tack, or stickiness, such that a first object is attached to a second object with a removable adhesive the first object can be readily removed in a manner that ideally, though not necessarily practically, leaves behind no adhesive residue on the second object. A repositionable adhesive is a subset of removable adhesives that are intended to allow the first object to be reattached to a third object or the second object in the initial or a different position. Within this disclosure, a removable adhesive is assumed to include repositionable adhesives. A removable adhesive is often called fugitive glue.

Rigid Structure: As used in this disclosure, a rigid structure is a solid structure formed from an inelastic material that resists changes in shape. A rigid structure will permanently deform as it fails under a force. See bimodal flexible structure.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Solid: As used in this disclosure, a solid refers to a state (phase) of matter that: 1) has a fixed volume; and, 2) does not flow.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Suspension: As used in this disclosure, a suspension is a heterogeneous fluidic mixture containing items that will separate, often through sedimentation, over time.

Tape: As used in this disclosure, tape refers to a flexible and narrow strip of textile or sheeting that fastens, secures, or strengthens an object.

Turbulence: As used in this disclosure, turbulence describes the motion or flow of a fluid wherein the velocities and pressures within the fluid flow will vary randomly or in an incalculably complex fashion. Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. A dust collecting device comprising
a fan blade and a collection structure;
wherein the collection structure mounts on the fan blade;
wherein the dust collecting device is a cleaning device;
wherein the dust collecting device removes dust that is suspended in air;
wherein the collection structure moves with the fan blade as the fan blade moves through the air;
wherein the collection structure comprises a first helical coil, a second helical coil, and an adhesive tape structure;
wherein the first helical coil attaches to the fan blade;
wherein the adhesive tape structure attaches to the fan blade.

2. The dust collecting device according to claim 1
wherein the collection structure further captures and immobilizes dislodged dust that falls out of the air onto the fan blade.

3. The dust collecting device according to claim 2
wherein the fan blade is an airfoil;
wherein the fan blade forms a working element of a fan;
wherein the fan blade generates an air flow in a predetermined direction as the fan rotates the fan blade through the air.

4. The dust collecting device according to claim 3
wherein the fan blade further comprises a leading edge;
wherein the leading edge forms an edge of the airfoil of the fan blade that leads the fan blade through the air;
wherein the leading edge redirects the air around the fan blade into the predetermined direction.

5. The dust collecting device according to claim 4
wherein the collection structure is a mechanical structure;
wherein the collection structure attaches to the fan blade;
wherein the collection structure generates a turbulence in the air that flows through the collection structure.

6. The dust collecting device according to claim 5
wherein the collection structure collects and stores the dust that was dislodged from the air;
wherein the collection structure immobilizes the captured dust that was dislodged from the air.

7. The dust collecting device according to claim 6
wherein the first helical coil is a mechanical structure;
wherein the first helical coil forms a helix;
wherein the first helical coil is a rigid structure;
wherein the first helical coil mounts on a superior surface of the fan blade.

8. The dust collecting device according to claim 7
wherein the first helical coil mounts on the fan blade such that a center axis of a coil structure of the first helical coil aligns with the leading edge of the fan blade;
wherein coils of the first helical coil pass through the air at an angle that is perpendicular to the leading edge of the fan blade.

9. The dust collecting device according to claim 8
wherein the adhesive tape structure is a sheeting structure;
wherein the adhesive tape structure forms a tape;
wherein the adhesive tape structure forms an adhesive surface.

10. The dust collecting device according to claim 9
wherein the adhesive tape structure further comprises an interior face and an exterior face;
wherein the interior face forms a face of the sheeting structure of the adhesive tape structure that is against the superior surface of the fan blade;
wherein the interior face is coated with a removable adhesive coating;
wherein the removable adhesive coating removably attaches the adhesive tape structure to the fan blade;
wherein the removable adhesive coating allows for a replacement of the adhesive tape structure;
wherein the exterior face of the adhesive tape structure is distal from the superior surface of the fan blade;
wherein the exterior face is coated with an adhesive coating;
wherein the adhesive coating captures the dust that was dislodged from the air as the first helical coil flows through the air;
wherein the adhesive coating on the exterior face immobilizes the dust.

11. The dust collecting device according to claim 6
wherein the second helical coil is a mechanical structure;
wherein the second helical coil forms a helix;
wherein the second helical coil is a rigid structure;
wherein the second helical coil mounts on an inferior surface of the fan blade.

* * * * *